Aug. 4, 1970 R. C. BUELER 3,522,706
TANDEM MASTER CYLINDER
Filed Aug. 15, 1968 2 Sheets-Sheet 1
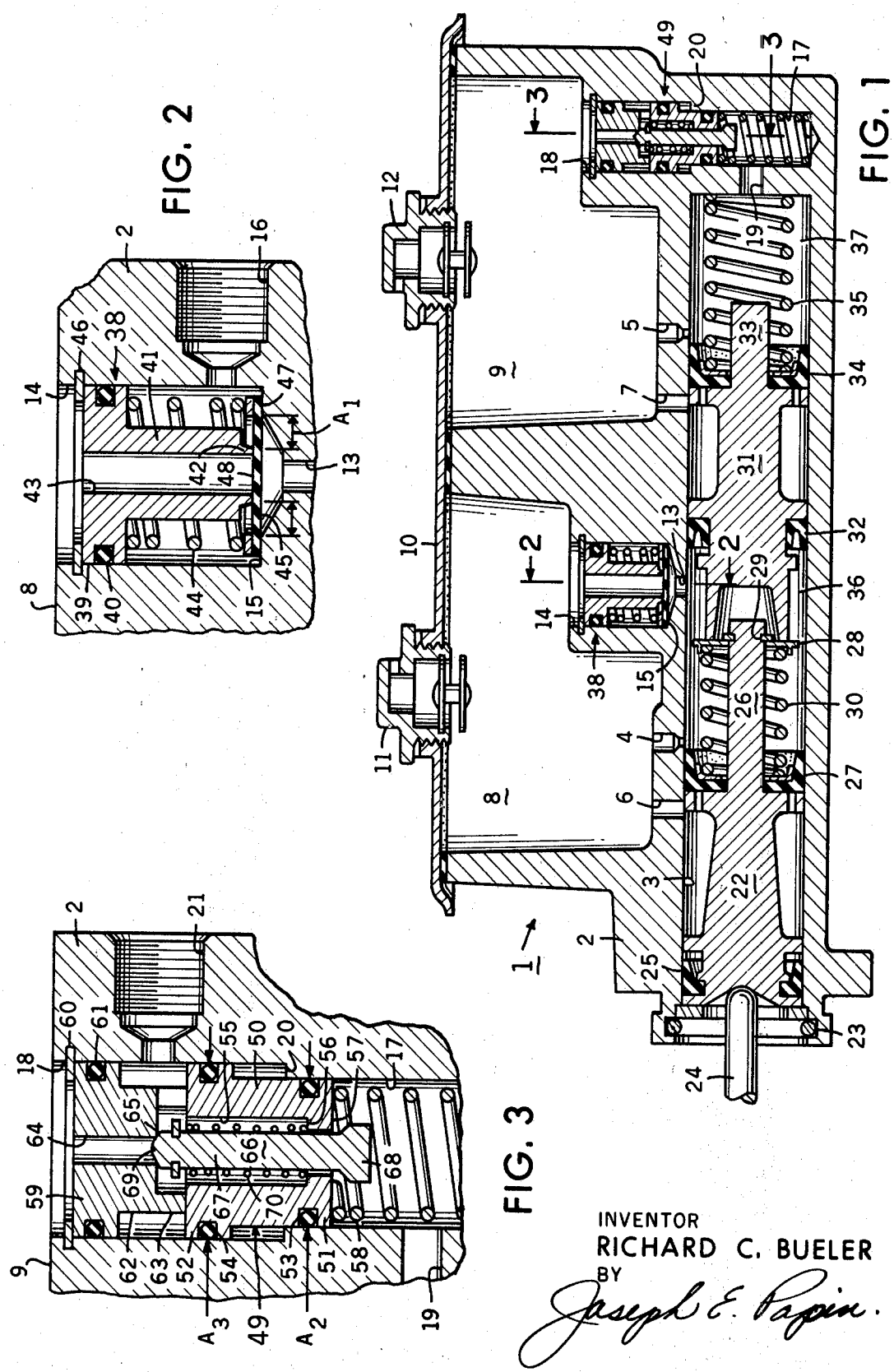
INVENTOR
RICHARD C. BUELER
BY
Joseph E. Papin.

Aug. 4, 1970   R. C. BUELER   3,522,706
TANDEM MASTER CYLINDER

Filed Aug. 15, 1968   2 Sheets-Sheet 2

INVENTOR
RICHARD C. BUELER
BY
Joseph E. Papin

United States Patent Office 3,522,706
Patented Aug. 4, 1970

3,522,706
TANDEM MASTER CYLINDER
Richard C. Bueler, Glendale, Mo., assignor to Wagner Electric Corporation, Newark, N.J., a corporation of Delaware
Filed Aug. 15, 1968, Ser. No. 752,904
Int. Cl. F15b 7/00, 7/08
U.S. Cl. 60—54.5                                                        9 Claims

ABSTRACT OF THE DISCLOSURE

A tandem master cylinder having an inhibiting portion for delaying the application of fluid pressure from one fluid pressure generating portion thereof to vehicle front disc brakes and a proportioning portion for proportioning the application of fluid pressure from the other fluid pressure generating portion thereof to vehicle rear drum brakes.

Figure 4:
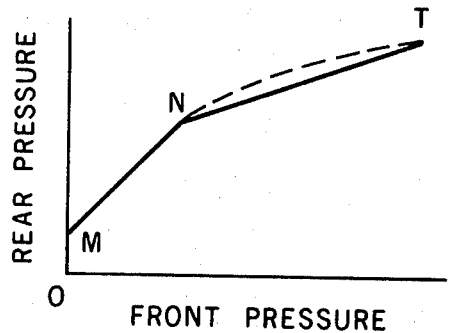

This invention relates to tandem master cylinders and in particular to those incorporating means for modifying the fluid pressure applied from the separate fluid pressure generating portions thereof.

In the past vehicle split or dual braking systems, tandem master cylinders have been employed to actuate vehicle front and rear brakes, and when different types of brakes were employed, such as for instance spot disc brakes on the front axle set and conventional drum type brakes on the rear axle set, it was necessary to utilize an inhibitor valve connected in the brake system between one tandem master cylinder fluid pressure generating portion and the front disc brakes in order to retard or delay the energization thereof since the rear drum brakes were energized at a much higher fluid pressure. Further, during vehicle deceleration, the front brakes absorb the preponderance of the braking force due to vehicle weight distribution, inertia, et cetera; therefore, it was desirable to utilize a proportioning valve connected in the brake system between the other fluid pressure generating portion of the tandem master cylinder and the rear brakes in order to prevent the locking of said rear brakes at the relatively higher generated fluid pressure necessary to effectively energize the front brakes and the resultant vehicle tendency to skid. One of the disadvantageous or undesirable features of such past braking systems was the complexity of the "plumbing" or connections involved in connecting the separate inhibiting valve and proportioning valve in the system. Another disadvantageous or undesirable feature of such past braking systems was that separate inhibiting and proportioning valves were employed further consuming the "under-the-hood" vehicle space which, in modern vehicles, is critical and becoming more scarce. Another disadvantageous or undesirable feature of such past braking systems was the cost involved not only in the manufacture of the separate inhibiting and proportioning valve for use with the tandem master cylinder but also in the installation thereof on the production line of the vehicle manufacturer. Still another disadvantageous or undesirable feature of such past braking systems was the rather high hysteresis loss between the displacement and return pressure fluid flow through the proportioning valve downstream of the tandem master cylinder since the return flow of the displaced pressure fluid manifestly flowed through said proportioning valve. And yet another disadvantageous or undesirable feature of such past braking systems was that bleeding of the inhibiting valve downstream of the tandem master cylinder was extremely difficult since such inhibiting valves are actuated at approximately 100–125 p.s.i. and bleeding pressure for the system is appreciably less; therefore, it was necessary to employ a manual release for such inhibiting valves in order to effect proper bleeding of such past braking systems.

Figure 5:
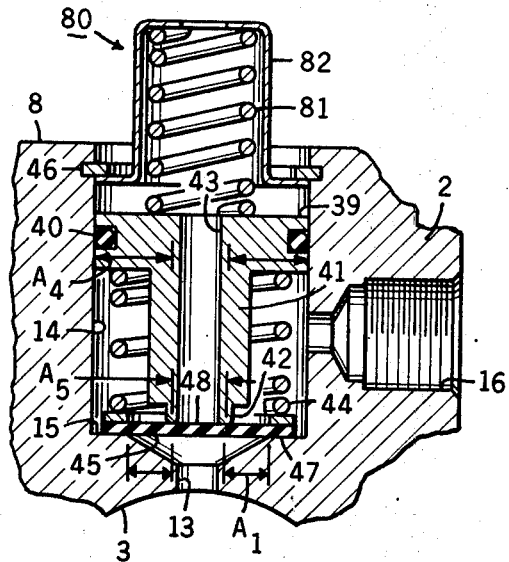
Figure 6:
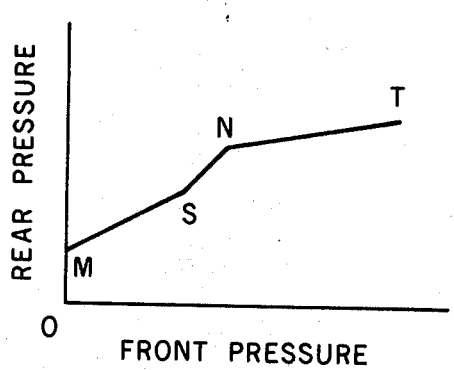

The principal object of the present invention is to provide a tandem master cylinder for use in a braking system utilizing both front disc brakes and rear drum brakes which overcomes the aforementioned disadvantageous or undesirable features, and this, as will as other objects and advantageous features for the present invention, will become apparent from the following description taken in conjunction with the accompanying drawings which form a part of this specification and in which:

FIG. 1 is a sectional view illustrating the preferred embodiment of the present invention in cross-section, FIG. 2 is an enlarged sectional view taken along line 2—2 of FIG. 1, FIG. 3 is an enlarged sectional view taken along line 3—3 of FIG. 1, FIG. 4 is a graphical representation illustrating the relationship between the front and rear brake pressures provided by the preferred embodiment of the present invention, FIG. 5 is a fragmentary sectional view illustrating a modification of the inhibiting portion in the preferred embodiment of FIG. 1 in cross-section, and FIG. 6 is a graphical representation illustrating the relationship between the front and rear brake pressures effected upon the incorporation of the modification shown in FIG. 5 in the preferred embodiment.

Referring now to the drawings in detail and in particular to FIG. 1, a fluid pressure generating device, such as the tandem or split master cylinder indicated generally at 1, is provided with a housing 2 having an axially extending bore 3 therein connected by axially spaced compensating ports 4, 5 and supply ports 6, 7 with separate fluid pressure supply reservoirs or sump chambers 8, 9, and a suitable cover 10 having vent caps 11, 12 therein is connected to said housing closing said sump chambers. Stepped bores 13, 14 having a shoulder or valve seat 15 therebetween are provided in the housing 2, and the smaller stepped bore 13 intersects with the bore 3 adjacent to the mid-portion thereof while the larger stepped bore 14 connects with the sump 8. As shown in FIG. 2, an outlet or delivery port 16 is also provided in the housing 2 intersecting with the larger stepped bore 14 and adapted for connection with fluid pressure responsive motors, such as the vehicle front disc brakes (not shown). Another vertical or stepped bores 17, 18 are also provided in the rightward end of the housing 2, and the larger of said stepped bores 18 is connected with the sump 9 while the smaller of said stepped bores 17 is connected with the end wall of the bore 3 by a connecting passage 19. A shoulder 20 is provided on the housing 2 at the juncture of the stepped bores 17, 18, and as shown in FIG. 3, another outlet or delivery port 21 is provided in the housing 2 intersecting with the larger stepped bore 18 adjacent to the mid-portion thereof and adapted for connection with fluid pressure responsive motors, such as the vehicle rear drum brakes (not shown).

A fluid pressure generating member or manually actuated piston 22 is slidably received in the bore 3 and retained against displacement therefrom by a snap ring and groove assembly 23 provided adjacent to the leftward end of said axial bore, and an operator controlled push rod 24 is drivingly connected with the leftward end of said piston. A secondary seal 25 is carried on the piston 22 adjacent to the leftward end thereof in sealing engagement with the bore 3, and an extension 26 is provided on the rightward end of said piston. A primary sealing member or cup 27 is carried on the piston 22 in sealing engagement with the bore 3, and a retainer member 28 is slidably received on the extension 26 and normally urged into engagement with an abutment or snap ring 29 fixedly carried on said extension adjacent to the rightward or free end thereof by the compressive force of a return spring 30 biased between said primary seal and said retainer member.

Another fluid pressure generating member or floating piston 31 is slidably received in the bore 3 having a peripheral seal 32 adjacent to the leftward end thereof in sealing engagement with said bore, and another extension 33 is integrally provided on the rightward end of said piston having a free end for movement limiting engagement with the end wall of said bore. Another primary sealing member or cup 34 is carried on the piston 31 in sealing engagement with the bore 3, and a return spring 35 is biased between said sealing cup and the end wall of said bore normally urging the leftward end of said piston into abutting engagement with the spring retainer 28. It should be noticed that a fluid pressure generating chamber 36 is defined in the bore 3 between the sealing cup 27 on the piston 22 and the seal 32 in the piston 31 in open pressure fluid communication with the smaller stepped bore 13 and normally connected with the sump 8 through the compensation port 4 and that another fluid pressure generating chamber 37 is defined in said bore between the sealing cup 34 on the piston 31 and the end wall of said bore in open pressure fluid communication with the housing passage 19 and normally connected with the sump 9 through the compensating port 5.

Referring now to FIGS. 1 and 2, an inhibiting valve, indicated generally at 38, is provided with a seating member or piston 39 slidably received in the larger stepped bore 14 and carrying a peripheral seal 40 in sealing engagement with said larger stepped bore. An extension 41 is integrally provided on the seating member 39 protruding coaxially into the larger stepped bore 14 and having a free end 42 thereon defining a valve seat. An exhaust passage 43 is provided through the seating member 39 having a lower end extending through the valve seat 42 while the upper end thereof is connected in open pressure fluid communication with the sump 8, and an inhibiting or impeding spring 44 is pre-compressed between a valve member or diaphragm type seal 45 and said seating member normally urging said seating member into displacement preventing engagement with a snap ring and groove assembly 46 provided adjacent to the upper end of the larger stepped bore 14. The diaphragm seal 45 is provided with a radially outer or peripheral portion 47 which is urged by the spring 44 into sealing engagement with the housing shoulder or valve seat 15, and said diaphragm seal is also provided with a radially inner or central portion 48 which is normally sealably engaged with the seating member valve seat 42. In this manner, the sealing engagement of the diaphragm seal peripheral portion 47 with the housing valve seat 15 normally interrupts pressure fluid communication between the fluid pressure generating chamber 36 and the outlet port 16 through the stepped bores 13, 14, and the sealing engagement of the diaphragm seal central portion 48 with the seating member valve seat 42 normally interrupts pressure fluid communication between said outlet port and the sump 8 through the larger stepped bore 14 and the seating member passage 43. It should also be noted that the diaphragm seal 49 is provided with an effective area $A_1$ for subjection to fluid pressure in the chamber 36.

Referring now to FIGS. 1 and 3, a proportioning valve, indicated generally at 49, is provided with a stepped proportioning member or piston 50 having opposed ends 51, 52 respectively slidable in the housing stepped bores 17, 18 and carrying peripheral seals 53, 54 in sealing engagement with said cross-bore and smaller counterbore. It should be noted that the opposed ends 51, 52 of the proportioning pistons define opposed differential areas $A_2$, $A_3$ for subjection to fluid pressure in the chamber 37 and at the outlet port 21, respectively. A stepped passage 55 is provided through the proportioning piston 50 defining a shoulder 56 thereon, and a valve seat 57 is defined on the piston smaller end 51 about said stepped passage. A proportioning or metering spring 58 is pre-compressed between the end wall of the smaller stepped bore 17 and the piston smaller end 51 urging the piston larger end 52 into abutting engagement with a seating or abutment member 59. The seating member 59 is received in the larger stepped bore 18 and is retained therein against displacement by a snap ring and groove assembly 60 provided adjacent to the upper end of said larger stepped bore, said seating member having a peripheral seal 61 therein in sealing engagement with said larger stepped bore. An extension 62 is integrally provided on the seating member 59 having a free end portion 63 thereon protruding coaxially into the smaller counterbore 18 and defining a plurality of abutments for positioning or abutting engagement with the proportioning piston larger end 52, as previously mentioned, and an exhaust passage 64 is provided through said seating member having one end thereof connected in pressure fluid communication with the sump 9 while the other end intersects with the extension free end 63. An exhaust valve seat 65 is defined on the seating member free end 63 about the exhaust passage 64, and a valve member 66 is provided with a stem 67 which extends coaxially through the proportioning piston passage 55 having opposed valve elements or heads 68, 69 for cooperative engagement with the proportioning piston valve seat 57 and said exhaust valve seat, respectively. A valve spring 70 of negligible force is biased between the valve stem 67 and the proportioning piston shoulder 56 normally urging the valve member head 69 into engagement with the exhaust valve seat 65 to close the exhaust passage 64 and interrupt pressure fluid communication between the sump 9 and the outlet port 21 through the housing larger stepped bore 18, and to complete the description of the tandem master cylinder 1, the valve member head 68 is normally spaced from the proportioning piston valve seat 57 to provide open pressure fluid communication between the fluid pressure generating chamber 37 and the outlet port 21 through the housing passage 19 and smaller stepped bore 17, the proportioning piston passage 55 and the larger stepped bore 18.

Since the operation of the tandem master cylinder 1 is so well known in the art, it will not be described in detail; however, with the component parts of tandem master cylinder 1 in their original positions, as described hereinbefore, it will be understood that an operator applied force on the push rod 24 concertedly urges the piston and sealing cup 22, 27 rightwardly in the bore 3 closing the compensation ports 4, 5 and establishing fluid pressure $P_1$ in the chamber 36, and the fluid pressure $P_1$ in said chamber thereafter acts on the effective area of the floating piston 31 therein to exert a force to concertedly move said floating piston and the seal 34 rightwardly in said bore to establish a fluid pressure $P_2$ in the chamber 37. Fluid pressure displacement from the chamber 36 is of course, initially inhibited or impeded due to the compressive force $Fi$ of the inhibiting spring 44 urging the diaphragm seal peripheral portion 47 into sealing engagement with the valve seat 15 against the force of the fluid pressure $P_1$ in said chamber acting on the effective area $A_1$ of said diaphragm seal, and the force $P_1A_1$ further urges the diaphragm seal central portion 48 into sealing engagement with the exhaust valve seat 42 to maintain the seating member exhaust passage 43 isolated from the outlet port 16. When the fluid presure $P_1$ is increased along the line OM and attains the predetermined value M, as shown in the graph of FIG. 4, the force $P_1A_1$ is, of course, correspondingly increased to a value overcoming the inhibitive spring force $Fi$ thereby moving the diaphragm seal periperal portion 47 toward a position disengaged from the housing valve seat 15 to establish pressure fluid communication between the chamber 36 and the outlet port 16. In this manner, fluid pressure $P_1$ in excess of the predetermined value M is displaced from the chamber 36 through the stepped bores 13, 14 to the outlet port 16 to energize the front disc brakes (not shown) connected therewith. With the inhibiting valve 38 actuated, as described above, the magnitude of the fluid pressure in the chamber 36 is greater than that of the fluid pressure at the outlet port 16 by the value necessary to maintain the seal 45 displaced against the inhibiting spring force $Fi$; therefore, for the sake of clarity, the fluid pressure in excess of the predetermined value M at the outlet port will hereinafter be referred to as displaced or output fluid pressure $P_{1D}$.

At the same time, the fluid pressure $P_1$ in the chamber 36 actuates the floating piston 34 to effect the fluid pressure $P_2$ in the chamber 37, as previously mentioned, which flows through the connecting passage 19, the housing smaller stepped bore 17, the proportioning piston passage 55 and the larger stepped bore 18 to the outlet port 21 to effect energization of the rear shoe brakes (not shown) connected therewith. It should be assumed that the internal resistances of the rear shoe brakes are overcome when the magnitude of the fluid pressure $P_2$ attains the predetermined value M in order to effect the energization thereof substantially at the same time as the energization of the front disc brakes. When the magnitude of the fluid pressure $P_2$ is increased to the predetermined value N on the line OT in the graph of FIG. 4, the fluid pressure $P_2$ acting on the opposed differential areas $A_2$, $A_3$ of the proportioning piston 50 establishes opposed differential forces $P_2A_2$, $P_2A_3$, and since the area $A_3$ is predeterminately greater than the area $A_2$, the force $P_2A_3$ moves said proportioning piston downwardly from its normal position against the force $P_2A_2$ and the additive compressive force $Fp$ of the proportioning spring 58 toward an isolating position engaging the proportioning piston valve seat 57 with the valve head 68. With the proportioning piston 50 in its isolating position engaging the proportioning piston seat 57 with the valve member 68, the fluid pressure $P_2$ in the chamber 37 is isolated from the fluid pressure $P_2$ at the outlet port 21, and for the sake of clarity the isolated fluid pressure $P_2$ at the outlet port 21 will hereinafter be referred to as isolated or ratioed fluid pressure $P_{2R}$ so long as it remains isolated having a magnitude in excess of the predetermined value N.

When the fluid pressure $P_2$ is increased along the line OT of the graph in FIG. 4 to a value predeterminately greater than the predetermined value N, the force $P_2A_2$ is correspondingly increased and assisted by the proportioning spring force $F_p$ to move the proportioning piston 54 upwardly against the opposing force $P_{2R}A_3$ toward its metering or proportioning position disengaging the proportioning piston seat 57 from the valve head 68 to establish a metered or proportioning pressure fluid communication between the chamber 37 and the outlet port 21. In this manner, the increased fluid pressure $P_2$ is metered from the smaller stepped bore 17 through the proportioning piston passage 55 into the larger stepped bore 18 to effect a metered proportional increase in the isolated fluid pressure $P_{2R}$. When the magnitude of the fluid pressure $P_{2R}$ is proportionally increased to values wherein the force $P_{2R}A_3$ again overcomes the opposing force $P_2O_2$ assisted by the proportioning spring force $Fp$, the proportioning piston 50 is again moved against the proportioning spring 58 to its isolating position re-engaging the valve seat 57 with the valve head 68 to again interrupt pressure fluid communication between the chamber 37 and the outlet port 21 isolating the fluid pressure $P_2$ from the isolated fluid pressure $P_{2R}$. It should be noted that the magnitudes of the isolated fluid pressure $P_{2R}$ in excess of the predetermined value N is predeterminately less than that of the fluid pressures $P_1$, $P_2$ in excess of the predetermined value N; therefore, the intensity of the braking application of the rear shoe brakes is proportionally less than or in a predetermined inverse ratio with the intensity of the braking application of the front disc brakes between the values N and T on the line OT in the graph of FIG. 3. Of course, the component parts of the proportioning valve 49 are responsive to further increases in the fluid pressure $P_2$ in excess of the predetermined value N to effect further metered increases in the isolated fluid pressure $P_{2R}$ in excess of the predetermined value N for increasing the intensity of the braking application at the rear shoe brakes in the same manner as described hereinabove.

When the desired intensity of the braking application has been attained or a complete stop effected, the operator applied force is removed from the push rod 24 to permit movement of the fluid pressure generating pistons 22, 31 toward their original positions thereby decreasing the fluid pressures $P_1$, $P_2$ and effecting the return flow thereof through the compensating ports 4, 5 to the sumps 8, 9, respectively. When the fluid pressure $P_2$ is so decreased to a magnitude less than that of the isolated fluid pressure $P_{2R}$, the force $P_2A_2$ is correspondingly reduced, and the force $P_{2R}A_3$ overcomes the reduced force $P_2A_2$ assisted by the proportioning spring force $Fp$ to concertedly move the proportioning piston 50 and the valve member 66 downwardly to disengage the valve head 69 from the exhaust valve seat 65 on the seating member 59 thereby permitting the direct return of the isolated or displaced fluid pressure $P_{2R}$ from the outlet port 21 through the larger stepped bore 18 and the seating member exhaust passage 64 into the sump 9 to de-energize the rear shoe brakes. When the isolated fluid pressure $P_{2R}$ is so returned directly to the sump 9 through the exhaust passage 64, the magnitude thereof is reduced along the dotted return line between R to N, as shown in the graph of FIG. 4, and it should be noted that the direct return of the displaced isolated fluid pressure $P_{2R}$ to the sump 9 through the exhaust passage 64 appreciably reduces the hysteresis loss between the displacement and return flows. When the magnitudes of the fluid pressure $P_2$ and the isolated fluid pressure $P_{2R}$ are so reduced to a value less than the predetermined value N, the force $P_2A_2$ and the proportioning spring force $Fp$ overcomes the force $P_{2R}A_3$ to move the proportioning piston 50 upwardly toward its original position re-engaging the valve head 69 with the seating member valve seat 65 to again close the exhaust passage 64 and disengaging the proportioning piston valve seat 57 from the valve head 68 to again open the proportioning piston passage 55 and re-establish open pressure fluid communication between the chamber 37 and the outlet port 21. In this manner, the fluid pressure $P_2$ and the isolated fluid pressure $P_{2R}$ are eliminated, and the displaced pressure fluid now returns from the outlet port 21 through the larger stepped bore 18, the proportioning piston passage 55, the smaller stepped bore 17, and the connecting passage 19 into the chamber 37 and therefrom through the compensating port 5 to the sump 9.

At the same time, the reduction of the fluid pressure $P_1$ in the chamber 36, as previously mentioned, effects a corresponding reduction of the force $P_1A_1$ to a value wherein the force $Fi$ of the inhibiting spring 44 re-engages the diaphragm seal peripheral portion 47 with the housing valve seat 15 to isolate the fluid pressure $P_1$ in the chamber 36 from the displaced fluid pressure $P_{1D}$ at the outlet port 16. Thereafter, the displaced fluid pressure $P_{1D}$ at the outlet port 16 acts on the effective area $A_1$ of the diaphragm seal 45 to effect the disengagement of the central portion 48 thereof from the seating member valve seat 42 to open the exhaust passage 43 and establish open pressure fluid communication therethrough between the sump 8 and the outlet port 16. In this manner, the return flow of the displaced fluid pressure $P_{1D}$ is effected from the outlet port 16 through the larger stepped bore 14 and the exhaust passage directly to the sump 8 to de-energize the front disc brakes.

Referring now to FIG. 5, a modified inhibiting valve 80 is shown for use in the tandem master cylinder 1 having substantially the same component parts and functioning in substantially the same manner as the previously described inhibiting valve 38 with the following exceptions.

In the inhibiting valve 80, the seating member 39 is normally urged against the inhibiting spring 44 to maintain its desired pre-compressed force $Fi$ by another spring 81 biased between the upper end of said seating member and a cup-shaped retainer 82 which is received in the larger stepped bore 14 and, in turn, biased into displacement preventing engagement with the snap ring 46, said spring 80 having a force predeterminately greater than said inhibiting spring 48. The seating member 39 is also provided with an effective area $A_4$ for subjection to the displaced fluid pressure $P_{1D}$ at the outlet port 16, and another area $A_5$ which is additive to the area $A_4$ is defined by the seating engagement of the diaphragm seal central portion 48 with the seating member exhaust valve seat 42 for subjection to the fluid pressure $P_1$ in the chamber 36.

In the operation, when the fluid pressure $P_1$ attains the predetermined value M as shown on the graph of FIG. 6, the force $P_1 A_1$ of the fluid pressure $P_1$ in the chamber 36 acting on the effective area $A_1$ of the diaphragm seal 45 attains a magnitude great enough to overcome the force of the inhibiting spring 44 thereby disengaging the diaphragm seal peripheral portion 47 from the housing valve seat 15 to effect pressure fluid communication between said chamber and the outlet port 16 and establish the displaced fluid pressure $P_{1D}$ at said outlet port. At the predetermined value M, the fluid pressure $P_1$ is predeterminately greater than the displaced fluid pressure $P_{1D}$ by the value necessary to overcome the force $F_2$ of the inhibiting spring 44, as previously mentioned; however, the displaced fluid pressure $P_{1D}$ acts on the effective area $A_4$ of the seating member 39 to establish a force $P_{1D} A_4$ in opposition to the compressed force of the spring 81. As the magnitude of the displaced fluid pressure $P_{1D}$ is increased along the line MS in the graph of FIG. 6, the force $P_{1D} A_4$ is correspondingly increased to urge the seating member 43 upwardly in the stepped bore 14 against the force of the spring 81 which, in effect, serves to decrease the force $Fi$ of the inhibiting spring 44, and the force $P_{1D} A_4$ is assisted by the force $P_1 A_5$ of the fluid pressure $P_1$ in the chamber 36 acting on the effective area $A_5$. Since the inhibiting spring force $Fi$ is being decreased by the upward movement of the seating member 39 it is apparent that incremental increases in the fluid pressure $P_1$ will effect greater incremental increases in the displaced fluid pressure $P_{1D}$, and when the magnitude of the displaced fluid pressure $P_{1D}$ attains the predetermined value S on the graph of FIG. 6, the forces $P_{1D} A_4$ and $P_1 A_5$ are also increased to additive values overcoming the force of the spring 81 and urging the seating member 43 toward an inoperative position into abutting engagement with the retainer 82 and the snap ring 46. When the seating member 39 is in its inoperative position, the inhibiting spring 44 is extended to a length wherein the compressive force $Fi$ thereof is negligible and the inhibiting function of the inhibiting valve 80 is obviated; therefore, it is apparent that the magnitude of the fluid pressure $P_1$ in the chamber 37 and the magnitude of the displaced fluid pressure $P_{1D}$ will be substantially equal for all values thereof in excess of the predetermined value S.

When the desired vehicle deceleration or a complete stop is attained, the applied force on the push rod 24 is removed to permit the return of the pistons 22, 31 toward their original positions, as previously mentioned, and such return movement of the piston 22 reduces the magnitude of the fluid pressure $P_1$ in the chamber 36 to establish a fluid pressure differential with the fluid pressure $P_{1D}$ across the diaphragm seal 45 which effects the sealing engagement thereof with the housing valve seat 15. When the diaphragm seal 45 is so re-engaged with the housing valve seat 15, the fluid pressure $P_1$ in the chamber 36 is exhausted through the compensating port 4 to the sump 8, and the displaced fluid pressure $P_{1D}$ acts on the effective area $A_1$ of said diaphragm seal to effect the disengagement of the central portion 48 thereof from the seating member exhaust valve seat 42 to open the seating member exhaust passage 43 and establish open pressure fluid communication therethrough between the sump 8 and the outlet port 16. In this manner, return flow of the displaced fluid pressure $P_{1D}$ is effected from the outlet port 16 through the stepped bore 14 and the exhaust passage 43 into the sump 8 to eliminate the displaced fluid pressure $P_{1D}$ and de-energize the front disc brakes. Of course, during the actuation of the inhibiting valve 80, as described above, the floating piston 31 is responsive to the fluid pressure $P_1$ in the chamber 36 to establish the corresponding fluid pressure $P_2$ for energizing the rear shoe brakes in the same manner as previously discussed hereinbefore.

What is claimed is:

1. A fluid pressure generating device for energizing at least one set of brakes comprising a housing having fluid pressure generating chamber means therein and pressure fluid reservoir means communicating with said chamber means, a pair of passage means for respectively communicating said brake set with said chamber means and said reservoir means, movable means for generating fluid pressure in said chamber and displacing fluid pressure through one of said passage means to said brake set, proportioning means movable in said one passage means for metering the displaced fluid pressure and proportionally reducing the magnitude thereof to a value less than that of the generated fluid pressure only in response to generated fluid pressure in excess of a predetermined value in said chamber means, and valve means in said one passage means for metering engagement with said proportioning means and normally closing the other of said passage means, said proportioning means also being responsive to a reduction of the generated fluid pressure in said chamber means to a value less than that of the displaced fluid pressure to engage said valve means closing said one passage means and thereafter drive said valve means toward a position opening said other passage means for permitting the return flow therethrough of the displaced fluid pressure from said brake set to said reservoir means.

2. A fluid pressure generating device comprising a housing having a reservoir for pressure fluid therein, a port in said housing for connection with a fluid pressure responsive motor, movable means in said housing and defining therewith a fluid pressure generating chamber communicating with said reservoir, first passage means in said housing connected between said chamber and said port, said movable means being movable to generate fluid pressure in said chamber and displace fluid pressure through said first passage means to said port, second passage means in said housing connected between said first passage means and said reservoir means, valve means in said first passage means and normally closing said second passage means, and proportioning means movable in said first passage means for metering engagement with said valve means to meter the flow of displaced fluid pressure and proportionally reduce the magnitude thereof at said port to a value less than that of the generated fluid pressure in said chamber only in response to generated fluid pressure in excess of a predetermined value in said chamber and said proportioning means also being movable in response to a reduction of the generated fluid pressure in said chamber to a value less than that of the displaced fluid pressure at said port to concertedly move said valve means toward a position closing said first passage means and opening said second passage means for permitting the return flow therethrough of the displaced fluid pressure at said port to said reservoir means.

3. The fluid pressure generating device according to claim 2, comprising a valve seat about said second passage means in said first passage means, said valve means being normally engaged with said valve seat closing said second passage means and being disengaged from said valve seat to open said second passage means upon the concerted movement of said valve means with said proportioning means.

4. The fluid pressure generating device according to claim 3, wherein said first passage means includes a pair of stepped bores in said housing, the larger of said stepped bores being connected with said reservoir and said port and the smaller of said stepped bores being connected with said chamber, a seating member retained in said larger stepped bore against displacement therefrom between said reservoir and said port, a free end portion on said seating member in said larger stepped bore defining said valve seat, said second passage means being in said seating member having one end connecting with said reservoir and the other end thereof extending through said valve seat, said proportioning means including a stepped piston slidable in said stepped bores and having opposed end portions defining opposed effective areas respectively subjected to the generated fluid pressure in said chamber and the displaced fluid pressure at said port, third passage means in said piston defining a portion of said first passage means and connected between said opposed end portions, another valve seat on said stepped piston about said third passage means, a metering spring engaged with one of said opposed end portions and normally urging the other of said opposed end portions into abutment with said seating member, said valve means including a stem portion extending through said third passage means, and opposed head portions on said stem portion for sealing engagement with said first named and other valve seats, and a valve spring engaged with said valve means normally urging one of said head portions into engagement with said first named valve seat closing said second passage means, the other of said head portions being normally spaced from said other valve seat, said piston being initially movable against the force of said metering spring to engage said other valve seat with said other head portion closing said third passage means when the generated fluid pressure in said chamber acting on the smaller of said differential areas and the displaced fluid pressure at said port acting on the larger of said differential areas attain the predetermined value and said piston also being further movable against the displaced fluid pressure at said port acting on said larger differential area in response to increases in the generated fluid pressure in excess of the predetermined value in said chamber acting on said smaller differential area and assisted by the force of said metering spring to disengage said other valve seat from said other head portion opening said third passage means and effecting a metered increase in the displaced fluid pressure at said port in a predetermined proportion with the increased generated fluid pressure in said chamber in excess of the predetermined value, and said piston and said valve means being concertedly movable when said other valve seat is engaged with said other valve means in response to the displaced fluid pressure acting on said larger differential area against the force of said metering spring upon the reduction of the generated fluid pressure in said chamber acting on said smaller differential area to the value less than that of the displaced fluid pressure at said port to disengage said one head portion from said first named valve seat and open said second passage means for permitting the return flow therethrough of the displaced fluid pressure at said port to said reservoir means.

5. The fluid pressure generating device according to claim 2, third passage means in said proportioning means and defining a portion of said first passage means, a valve seat on said proportioning means about said third passage means, and said valve means extending through said third passage means and having a head portion thereof for metering engagement with said valve seat, said proportioning means being initially movable to engage said valve seat with said head portion when the generated fluid pressure in said chamber and the displaced fluid pressure at said port attain the predetermined value and said proportioning means also being further movable in response to increases in the generated fluid pressure in excess of the predetermined value in said chamber to disengage said valve seat from said head portion to effect a metered increase in the displaced fluid pressure at said port in a predetermined proportion with the increased generated fluid pressure in said chamber in excess of the predetermined value.

6. The fluid pressure generating device according to claim 5, wherein said proportioning means includes stepped piston means movable in said first passage means, opposed end portions on said stepped piston means defining effective differential areas respectively subjected to the generated fluid pressure in said chamber and the displaced fluid pressure at said port, said third passage means being in said stepped piston means and connected between said opposed end portions, said valve seat being on the smaller of said opposed end portions about said third passage means, and a metering spring contained between said housing and said smaller opposed end portion, another valve seat on said housing about said second passage means and facing said first passage means, another head portion on said valve means for engagement with said other valve seat, and resilient means engaged with said valve means normally urging said other head portion into engagement with said other valve seat to close said second passage means, said stepped piston means being initially movable against the force of said metering spring when the generated fluid pressure in said chamber acting on the smaller of said differential areas and the displaced fluid pressure at said port acting on the larger of said differential areas attain the predetermined value to engage said first named valve seat with said first named head portion, said stepped piston means also being thereafter further movable against the displaced fluid pressure at said port acting on said larger differential area in response to the increased generated fluid pressure in excess of the predetermined value acting on said smaller differential area and assisted by the force of said metering spring to disengage said first named valve seat from said first named head portion and effect a metered increase in the displaced fluid pressure at said port in a predetermined ratio with the increased generated fluid pressure in said chamber in excess of the predetermined value, and said stepped piston means and valve means being concertedly movable when said first named valve seat and head portion are engaged in response to the displaced fluid pressure acting on said larger differential area against the force of said metering spring upon the reduction of the generated fluid pressure in said chamber acting on said smaller differential area to the value less than that of the displaced fluid pressure at said port to disengage said other head portion from said other valve seat.

7. The fluid pressure generating device according to claim 2, comprising a valve seat about said second passage means and in said first passage means, third passage means in said proportioning means defining a portion of said first passage means, another valve seat on said proportioning means about said third passage means, said valve means extending through said third passage means and having opposed portions for sealing engagement with said first named and other valve seats, and said proportioning means being initially movable to engage said other valve seat with one of said opposed portions when the generated fluid pressure in said chamber and the displaced fluid pressure at said port attain the predetermined value and said proportioning means being further movable in response to increases in the generated fluid pressure in excess of the predetermined value in said chamber to disengage said other valve seat from said one portion and effect a metered increase in the displaced fluid pressure at said port in a predetermined proportion with the increased generated fluid pressure in excess of the predetermined value in said chamber, and resilient means normally urging the other of said opposed portions into engagement with said first named valve seat closing said second passage means, said other opposed portion being disengaged from said first named valve seat against said resilient means to open said second passage means upon the concerted movement of said valve means with said proportioning member.

8. A fluid pressure generating device for energizing a pair of brake sets comprising a housing having a pair of fluid pressure generating chamber means therein and a pair of reservoir means communicating with said chamber means, respectively, a first pair of passage means for respectively communicating said chamber means with said brake sets, a second pair of passage means for respectively communicating said brake sets with said reservoir means, a pair of movable means for respectively generating fluid pressure in said chamber means and displacing fluid pressure to said brake sets, a pair of valve means in said first pair of passage means and normally closing said second pair of passage means, respectively, one of said valve means permitting the flow of displaced fluid pressure through one of said first pair of passage means to one of said brake sets only in response to generated fluid pressure in excess of a predetermined value in one of said chamber means and also being responsive to a reduction of the generated fluid pressure in said one chamber means to a value less than that of the displaced fluid pressure to said one brake set to close said one passage means of said first pair and open one of said second pair of passage means for permitting the return flow therethrough of the displaced fluid pressure from said one brake set to one of said reservoir means, and proportioning means movable in the other of said first pair of passage means for metering engagement with the other of said valve means to meter the displaced fluid pressure to the other of said brake sets and proportionally reduce the magnitude thereof to a value less than that of the generated fluid pressure in the other of said chamber means only in response to generated fluid pressure in excess of another predetermined value in said other chamber means, and said proportioning means also being responsive to a reduction of the generated fluid pressure in said other chamber means to a value less than that of the displaced fluid pressure to said other brake set to move said other valve means toward a position closing said other passage means of said first pair and opening the other of said second pair of passage means for permitting the return flow therethrough of the displaced fluid pressure from said other brake set to the other of said reservoir means.

9. A fluid pressure generating device comprising a housing having a pair of reservoirs for pressure fluid therein, a pair of ports in said housing for respective connection with a pair of fluid pressure responsive motors, a pair of movable means in said housing and defining therewith a pair of fluid pressure generating chambers respectively communicating with said reservoir means, a first pair of passage means in said housing respectively connected between said chambers and said ports, a second pair of passage means in said housing respectively connected with said reservoirs and with said first pair of passage means between said chambers and said ports, said movable means being movable to generate fluid pressure in said chambers and displace fluid pressure through said first pair of passage means to said ports, respectively, fluid pressure responsive valve means in one of said first pair of passage means and normally closing one of said second pair of passage means for permitting the flow of displaced fluid pressure through said one of said first pair of passage means to one of said ports only in response to generated fluid pressure in excess of a preedtermined value in one of said chambers and also being responsive to a reduction of the generated fluid pressure in said one chamber to a value less than that of the displaced fluid pressure at said one port to close said one passage means of said first pair and open said one passage means of said second pair permitting the return flow therethrough of the displaced fluid pressure from said one port to one of said reservoirs, and proportioning means movable in the other of said first pair of passage means for metering the displaced fluid pressure to the other of said ports and proportionally reducing the magnitude thereof to a value less than that of the generated fluid pressure in the other of said chambers only in response to generated fluid pressure in excess of another predetermined value in said other chamber, and other valve means in said other passage means of said first pair for metering engagement with said proportioning means and normally closing the other of said second pair of passage means, said proportioning means also being responsive to a reduction of the generated fluid pressure in said other chamber to a value less than that of the displaced fluid pressure at said other port to drivingly engage said other valve means closing said other passage means of said first pair and thereafter drive said other valve means toward a position opening said other passage means of said second pair for permitting the return flow therethrough of the displaced fluid pressure at said other outlet port to the other of said reservoirs.

References Cited

UNITED STATES PATENTS

| | | | |
|---|---|---|---|
| 2,161,304 | 6/1939 | Loweke | 60—54.6 XR |
| 2,547,233 | 4/1951 | Seppmann | 60—54.6 |
| 3,221,502 | 12/1965 | Shellhause | 60—54.6 |

MARTIN P. SCHWADRON, Primary Examiner

R. BUNEVICH, Assistant Examiner

U.S. Cl. X.R.

188—152